Patented Feb. 23, 1937

2,071,542

UNITED STATES PATENT OFFICE 2,071,542

FRIABLE CORE FOR MOLDS

Hobart McKinley Kraner, Bethlehem, Pa., assignor to Corhart Refractories Company, Louisville, Ky., a corporation of Delaware No Drawing. Application May 26, 1936, Serial No. 81,962

7 Claims. (Cl. 49—65)

Cast refractories, such for instance as those disclosed in United States patent to Fulcher No. 1,615,750, are generally cast in sand molds or in special cases in molds formed from grains of the same composition as the refractory itself (see U. S. Patent to Schroeder, No. 1,903,944). If either of these materials are used to form cores around which a hollow refractory is to be cast difficulties are experienced. Sand tends to cause cracking. All cast refractories contain a substantial percentage, say 20%, of glass, which in some cases melts as much as 500° C. below the temperature at which the refractory is poured. When a core is formed of grains of such a refractory the glass in or on the grain melts during the casting and on solidifying binds the core into a hard compact body which is difficult to remove from the cast product. I find that this excessive hardness can be prevented by mixing with the grains in question a proper percentage of material, the composition of which is such that no, or only a small quantity of, glass is formed on the melting thereof or of a refractory some ingredient of which reacts with the glass to form a refractory composition. In both cases the result is a reduction of the percentage of glass in the core. If the added material, for instance, is an aluminum oxide poor in silica the alumina reacts with some of the silica in the glass of the grain and thus reduces the percentage of glass. Thus bauxite is suitable for this purpose due to the small amount of fluxes or silica contained therein. Diaspore is suitable on account of its low silica content. Magnesite and alumina contain practically no flux and produce practically no glass.

In the following mixtures, which are suitable for practicing this invention, "melt" refers to the refractory sold by the Corhart Refractories Company under the name "Corhart", it consisting of micro-crystalline corundum and mullite and a glassy binder, the binder amounting to about 20%.

|  | A | B | C |
|---|---|---|---|
| Melt | Percent 25 to 75 | Percent 66 | Percent 66 |
| Bauxite | 75 to 25 | | |
| Diaspore | | 34 | |
| Magnesite | | | 34 |

The percentages of "melt" in mixtures B, C and of the other ingredients thereof can be decreased or increased to 25% or to 75% as in mixture A.

In all cases the materials, other than the "melt", should be calcined and ground, the size of the resulting grain being preferably greater than that passing through a 60-mesh per inch screen but not coarser than that passing a 20-mesh per inch screen. The grains of "melt" should also be of this size. The materials are thoroughly mixed with linseed oil as a binder, molded to desired form, and baked at a temperature of about 200° C., after which they are ready for use.

Having thus described my invention what I claim is:

1. A core for a mold in which refractory material is cast at a temperature of about 1800° C., consisting of a mixture of grains of said refractory and of grains of a precalcined refractory material containing only small amounts of glass-forming ingredients.

2. A core for a mold in which refractory material is cast at a temperature of about 1800° C., consisting of a mixture of grains of a refractory cast product containing a substantial percentage of glass and of grains of a precalcined refractory material containing only small amounts of glass-forming ingredients.

3. A core for a mold in which refractory material is cast at a temperature of about 1800° C., consisting of a mixture of grains of said refractory and of grains of a precalcined bauxite.

4. A core for a mold in which refractory material is cast at a temperature of about 1800° C., consisting of a mixture of grains of said refractory and of grains of a precalcined diaspore.

5. A core for a mold in which refractory material is cast at a temperature of about 1800° C., consisting of a mixture of grains of said refractory and of grains of a precalcined magnesite.

6. A core for a mold in which a melted refractory containing mullite and glass and melting around 1800° C. is cast, consisting of a mixture of grains of said refractory, and of grains of a precalcined refractory material containing only a small amount of glass-forming ingredients.

7. A core for a mold in which refractory material is cast at a temperature of about 1800° C. consisting of a mixture of grains of a refractory cast product containing a substantial percentage of glass and of grains of a precalcined material poor in silica and containing an ingredient which under the temperature present will unite with the silica of the glass.

HOBART McKINLEY KRANER.